United States Patent
DeHaan

(10) Patent No.: US 9,100,297 B2
(45) Date of Patent: Aug. 4, 2015

(54) REGISTERING NEW MACHINES IN A SOFTWARE PROVISIONING ENVIRONMENT

(75) Inventor: Michael Paul DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 421 days.

(21) Appl. No.: 12/194,754

(22) Filed: Aug. 20, 2008

(65) Prior Publication Data

US 2010/0049838 A1    Feb. 25, 2010

(51) Int. Cl.
| | |
|---|---|
| *G06F 15/177* | (2006.01) |
| *G06F 15/173* | (2006.01) |
| *H04L 12/24* | (2006.01) |
| *H04L 29/08* | (2006.01) |
| *H04L 12/26* | (2006.01) |

(52) U.S. Cl.
CPC ............ *H04L 41/0809* (2013.01); *H04L 41/12* (2013.01); *H04L 43/14* (2013.01); *H04L 67/10* (2013.01)

(58) Field of Classification Search
USPC .................................. 709/220–221, 223–224
See application file for complete search history.

(56) References Cited

U.S. PATENT DOCUMENTS

| | | | |
|---|---|---|---|
| 5,787,246 A * | 7/1998 | Lichtman et al. ............. | 709/220 |
| 5,835,719 A | 11/1998 | Gibson et al. | |
| 5,948,062 A | 9/1999 | Tzelnic et al. | |
| 6,105,100 A * | 8/2000 | Dean et al. .................... | 710/220 |
| 6,212,585 B1 * | 4/2001 | Chrabaszcz ................... | 710/302 |
| 6,243,747 B1 | 6/2001 | Lewis et al. | |
| 6,272,536 B1 | 8/2001 | van Hoff et al. | |
| 6,282,652 B1 | 8/2001 | Scheifler | |
| 6,381,742 B2 | 4/2002 | Forbes et al. | |
| 6,415,289 B1 | 7/2002 | Williams et al. | |
| 6,438,711 B2 | 8/2002 | Woodruff | |
| 6,516,427 B1 | 2/2003 | Keyes et al. | |
| 6,526,442 B1 * | 2/2003 | Stupek et al. ................. | 709/224 |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,611,869 B1 | 8/2003 | Eschelbeck et al. | |
| 6,625,742 B1 | 9/2003 | Owhadi et al. | |
| 6,678,888 B1 | 1/2004 | Sakanishi | |
| 6,686,838 B1 * | 2/2004 | Rezvani et al. ............... | 340/506 |
| 6,691,225 B1 | 2/2004 | Suffin | |
| 6,751,659 B1 | 6/2004 | Fenger et al. | |

(Continued)

OTHER PUBLICATIONS

Michael DeHaan, "Methods and Systems for Provisioning Software", U.S. Appl. No. 11/763,315, filed Jun. 14, 2007.

(Continued)

*Primary Examiner* — Minh-Chau Nguyen
(74) *Attorney, Agent, or Firm* — Lowenstein Sandler LLP

(57) ABSTRACT

A provisioning server can be configured to include an inventory module. The inventory module can be configured to automatically detect new target machines that are connected to the provisioning environment. Once detected, the inventory module can be configured to determine identification information for the detected target machines. The identification information can include information that uniquely identifies the detected machines and information describing the detected machines. The inventory module can be configured to enter the identification information in an inventory of machines in the provisioning environment. Once registered, the provisioning server can perform provisioning processes on the detected machines.

25 Claims, 4 Drawing Sheets

(56) References Cited

U.S. PATENT DOCUMENTS

| | | |
|---|---|---|
| 6,757,837 B1 | 6/2004 | Platt et al. |
| 6,769,022 B1 | 7/2004 | DeKoning et al. |
| 6,779,004 B1* | 8/2004 | Zintel ............................ 709/227 |
| 6,845,464 B2 | 1/2005 | Gold |
| 6,865,737 B1 | 3/2005 | Lucas et al. |
| 6,925,518 B2* | 8/2005 | Rudland et al. ............... 710/313 |
| 6,941,518 B2 | 9/2005 | French et al. |
| 6,947,939 B2 | 9/2005 | Fujibayashi et al. |
| 6,966,058 B2 | 11/2005 | Earl et al. |
| 6,986,033 B2 | 1/2006 | Miyamoto et al. |
| 7,003,560 B1 | 2/2006 | Mullen et al. |
| 7,013,461 B2 | 3/2006 | Hellerstein et al. |
| 7,036,010 B2 | 4/2006 | Wray |
| 7,051,101 B1 | 5/2006 | Dubrovsky et al. |
| 7,054,618 B1* | 5/2006 | McCullough ............... 455/414.1 |
| 7,058,797 B2 | 6/2006 | Miyamoto et al. |
| 7,082,464 B2 | 7/2006 | Hasan et al. |
| 7,107,330 B1 | 9/2006 | Hamilton et al. |
| 7,127,742 B2 | 10/2006 | Kramer et al. |
| 7,133,822 B1 | 11/2006 | Jacobson |
| 7,165,109 B2* | 1/2007 | Chiloyan et al. ............... 709/227 |
| 7,185,071 B2 | 2/2007 | Berg et al. |
| 7,197,608 B2* | 3/2007 | Mikuma et al. ............... 711/151 |
| 7,200,662 B2 | 4/2007 | Hasan et al. |
| 7,200,845 B2 | 4/2007 | Morrison et al. |
| 7,207,039 B2 | 4/2007 | Komarla et al. |
| 7,213,065 B2 | 5/2007 | Watt |
| 7,280,830 B2* | 10/2007 | Anderson et al. .......... 455/435.1 |
| 7,284,042 B2 | 10/2007 | Beadles et al. |
| 7,305,550 B2 | 12/2007 | Oliver et al. |
| 7,310,669 B2 | 12/2007 | Webb et al. |
| 7,330,967 B1 | 2/2008 | Pujare et al. |
| 7,340,637 B2 | 3/2008 | Nagoya |
| 7,346,801 B2* | 3/2008 | Brunelle et al. ............... 709/225 |
| 7,350,112 B2 | 3/2008 | Fox et al. |
| 7,356,679 B1 | 4/2008 | Le et al. |
| 7,383,433 B2 | 6/2008 | Yeager et al. |
| 7,395,322 B2 | 7/2008 | Harvey et al. |
| 7,434,253 B2 | 10/2008 | Crall et al. |
| 7,448,033 B1* | 11/2008 | Kruger et al. ................. 717/175 |
| 7,480,907 B1 | 1/2009 | Marolia et al. |
| 7,506,040 B1 | 3/2009 | Rabe et al. |
| 7,506,151 B2 | 3/2009 | Miyamoto et al. |
| 7,509,487 B2 | 3/2009 | Lu et al. |
| 7,516,218 B2 | 4/2009 | Besson |
| 7,519,691 B2 | 4/2009 | Nichols et al. |
| 7,574,481 B2* | 8/2009 | Moore et al. .................. 709/217 |
| 7,596,227 B2 | 9/2009 | Illowsky et al. |
| 7,600,005 B2 | 10/2009 | Jamkhedkar et al. |
| 7,606,868 B1 | 10/2009 | Le et al. |
| 7,627,617 B2 | 12/2009 | Kavuri et al. |
| 7,640,325 B1 | 12/2009 | DeKoning et al. |
| 7,653,008 B2 | 1/2010 | Patrick et al. |
| 7,668,947 B2 | 2/2010 | Hutchinson et al. |
| 7,671,735 B2 | 3/2010 | Karaoguz |
| 7,673,130 B2 | 3/2010 | Miyamoto et al. |
| 7,681,080 B2 | 3/2010 | Abali et al. |
| 7,689,664 B2 | 3/2010 | Karlberg |
| 7,716,316 B2 | 5/2010 | Nichols et al. |
| 7,734,717 B2* | 6/2010 | Saarimaki et al. ............ 709/217 |
| 7,779,119 B2 | 8/2010 | Ginter et al. |
| 7,787,863 B2 | 8/2010 | van de Groenendaal |
| 7,792,986 B2 | 9/2010 | Donoho et al. |
| 7,827,261 B1 | 11/2010 | Griswold et al. |
| 7,827,590 B2 | 11/2010 | Hopen et al. |
| 7,831,692 B2 | 11/2010 | French et al. |
| 7,831,997 B2 | 11/2010 | Eldar et al. |
| 7,937,437 B2 | 5/2011 | Fujii |
| 7,971,047 B1 | 6/2011 | Vlaovic et al. |
| 8,028,048 B2 | 9/2011 | Karve et al. |
| 8,051,181 B2 | 11/2011 | Larson et al. |
| 8,060,874 B2 | 11/2011 | Rengarajan et al. |
| 8,069,341 B2 | 11/2011 | Fries et al. |
| 8,073,908 B2 | 12/2011 | Heins et al. |
| 8,078,728 B1 | 12/2011 | Pollan et al. |
| 8,103,776 B2 | 1/2012 | DeHaan |
| 8,103,783 B2 | 1/2012 | Plamondon |
| 8,117,314 B2 | 2/2012 | Croft et al. |
| 8,117,600 B1 | 2/2012 | Roeck et al. |
| 8,131,825 B2 | 3/2012 | Nord et al. |
| 8,131,851 B2 | 3/2012 | Harlow |
| 8,132,166 B2 | 3/2012 | DeHaan |
| 8,185,891 B2 | 5/2012 | DeHaan |
| 8,205,240 B2 | 6/2012 | Ansari et al. |
| 8,244,836 B2 | 8/2012 | DeHaan |
| 8,271,975 B2 | 9/2012 | DeHaan |
| 8,336,089 B1 | 12/2012 | Ahmed et al. |
| 8,346,929 B1 | 1/2013 | Lai |
| 8,355,407 B2 | 1/2013 | Wookey et al. |
| 8,370,528 B2 | 2/2013 | Bryers et al. |
| 8,407,687 B2 | 3/2013 | Moshir et al. |
| 8,429,630 B2 | 4/2013 | Nickolov et al. |
| 8,498,941 B2 | 7/2013 | Felsher |
| 8,504,696 B2 | 8/2013 | Larson et al. |
| 2002/0062259 A1* | 5/2002 | Katz et al. ........................ 705/26 |
| 2002/0078186 A1 | 6/2002 | Engel et al. |
| 2002/0138567 A1 | 9/2002 | Ogawa |
| 2002/0138578 A1 | 9/2002 | Zhou |
| 2002/0162028 A1 | 10/2002 | Kennedy |
| 2003/0005097 A1* | 1/2003 | Barnard et al. ............... 709/223 |
| 2003/0055919 A1 | 3/2003 | Fong et al. |
| 2003/0069884 A1 | 4/2003 | Nair et al. |
| 2003/0069946 A1 | 4/2003 | Nair et al. |
| 2003/0070110 A1 | 4/2003 | Aija et al. |
| 2003/0074549 A1 | 4/2003 | Paul et al. |
| 2003/0110173 A1 | 6/2003 | Marsland |
| 2003/0119480 A1 | 6/2003 | Mohammed |
| 2003/0126585 A1 | 7/2003 | Parry |
| 2003/0145083 A1 | 7/2003 | Cush et al. |
| 2003/0195921 A1 | 10/2003 | Becker et al. |
| 2003/0212992 A1 | 11/2003 | Ronning et al. |
| 2003/0233648 A1 | 12/2003 | Earl et al. |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1* | 3/2004 | Breh et al. ..................... 709/229 |
| 2004/0059703 A1 | 3/2004 | Chappell et al. |
| 2004/0064501 A1 | 4/2004 | Jan et al. |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2004/0226010 A1 | 11/2004 | Suorsa |
| 2005/0027608 A1* | 2/2005 | Wiesmuller et al. ............ 705/26 |
| 2005/0028025 A1 | 2/2005 | Zalewski et al. |
| 2005/0050175 A1 | 3/2005 | Fong et al. |
| 2005/0055350 A1* | 3/2005 | Werme et al. ................... 707/10 |
| 2005/0108369 A1 | 5/2005 | Sather et al. |
| 2005/0114474 A1* | 5/2005 | Anderson et al. ............. 709/220 |
| 2005/0125525 A1* | 6/2005 | Zhou et al. .................... 709/223 |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0223374 A1 | 10/2005 | Wishart et al. |
| 2006/0041767 A1 | 2/2006 | Maxwell et al. |
| 2006/0080656 A1* | 4/2006 | Cain et al. ..................... 717/174 |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1* | 9/2006 | Horton et al. ................. 370/252 |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2007/0015538 A1 | 1/2007 | Wang |

(56) References Cited

U.S. PATENT DOCUMENTS

| | | |
|---|---|---|
| 2007/0067419 A1 | 3/2007 | Bennett |
| 2007/0078988 A1 | 4/2007 | Miloushev et al. |
| 2007/0101118 A1 | 5/2007 | Raghunath et al. |
| 2007/0118654 A1 | 5/2007 | Jamkhedkar et al. |
| 2007/0168721 A1 | 7/2007 | Luiro et al. |
| 2007/0169093 A1 | 7/2007 | Logan et al. |
| 2007/0192158 A1 | 8/2007 | Kim |
| 2007/0204338 A1 | 8/2007 | Aiello et al. |
| 2007/0226810 A1 | 9/2007 | Hotti |
| 2007/0234337 A1 | 10/2007 | Suzuki et al. |
| 2007/0239858 A1 | 10/2007 | Banerji et al. |
| 2007/0244996 A1 | 10/2007 | Ahmed et al. |
| 2007/0276905 A1 | 11/2007 | Durand et al. |
| 2007/0288612 A1 | 12/2007 | Hall |
| 2007/0294342 A1* | 12/2007 | Shah et al. ............... 709/203 |
| 2007/0294369 A1 | 12/2007 | Ginter et al. |
| 2007/0294376 A1 | 12/2007 | Ayachitula et al. |
| 2007/0299951 A1 | 12/2007 | Krithivas |
| 2008/0016515 A1 | 1/2008 | Naim et al. |
| 2008/0028048 A1 | 1/2008 | Shekar et al. |
| 2008/0040452 A1 | 2/2008 | Rao et al. |
| 2008/0046708 A1 | 2/2008 | Fitzgerald et al. |
| 2008/0059959 A1 | 3/2008 | Chen et al. |
| 2008/0130639 A1* | 6/2008 | Costa-Requena et al. .... 370/389 |
| 2008/0189693 A1 | 8/2008 | Pathak |
| 2008/0196043 A1 | 8/2008 | Feinleib et al. |
| 2008/0209033 A1 | 8/2008 | Ginter et al. |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0263543 A1 | 10/2008 | Ramachandran |
| 2008/0270674 A1 | 10/2008 | Ginzton |
| 2008/0294777 A1 | 11/2008 | Karve et al. |
| 2008/0298274 A1 | 12/2008 | Takashige et al. |
| 2008/0301666 A1 | 12/2008 | Gordon et al. |
| 2008/0313716 A1 | 12/2008 | Park |
| 2008/0320110 A1* | 12/2008 | Pathak .......................... 709/220 |
| 2009/0007091 A1 | 1/2009 | Appiah et al. |
| 2009/0055901 A1 | 2/2009 | Kumar et al. |
| 2009/0064132 A1 | 3/2009 | Suchy et al. |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0106674 A1* | 4/2009 | Bray et al. ................... 715/762 |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0228629 A1 | 9/2009 | Gebhart et al. |
| 2009/0235349 A1 | 9/2009 | Lai et al. |
| 2009/0240835 A1 | 9/2009 | Adelman et al. |
| 2009/0249296 A1 | 10/2009 | Haenel et al. |
| 2009/0249336 A1 | 10/2009 | Vasilevsky et al. |
| 2009/0249473 A1 | 10/2009 | Cohn |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2010/0023740 A1 | 1/2010 | Moon et al. |
| 2010/0049838 A1 | 2/2010 | DeHaan |
| 2010/0058332 A1 | 3/2010 | DeHaan |
| 2010/0100876 A1 | 4/2010 | Glover et al. |
| 2010/0217837 A1 | 8/2010 | Ansari et al. |
| 2010/0220584 A1 | 9/2010 | DeHaan et al. |
| 2010/0223504 A1 | 9/2010 | DeHaan et al. |
| 2010/0223608 A1 | 9/2010 | DeHaan et al. |
| 2010/0223609 A1 | 9/2010 | DeHaan et al. |
| 2010/0235433 A1 | 9/2010 | Ansari et al. |
| 2010/0333084 A1 | 12/2010 | DeHaan |
| 2011/0061045 A1 | 3/2011 | Phillips |
| 2011/0131304 A1 | 6/2011 | Henson |
| 2011/0131384 A1 | 6/2011 | Henson |
| 2012/0151470 A1 | 6/2012 | DeHaan |
| 2012/0185559 A1 | 7/2012 | Wesley et al. |

OTHER PUBLICATIONS

Michael DeHaan, "Methods and Systems for Provisioning Software", U.S. Appl. No. 11/763,333, filed Jun. 14, 2007.

DeHaan, "Systems and Methods for Providing Configuration Management Services from a Provisioning Server", U.S. Appl. No. 12/414,941, filed Mar. 31, 2009.

DeHaan, "Systems and Methods for Retiring Target Machines by a Provisioning Server", U.S. Appl. No. 12/475,427, filed May 29, 2009.

DeHaan, "Methods and Systems for Centrally Managing Multiple Provisioning Servers", U.S. Appl. No. 12/201,193, filed Aug. 29, 2008.

DeHaan, "Methods and Systems for Assigning Provisioning Servers in a Software Provisioning Enviroment", U.S. Appl. No. 12/201,646, filed Aug. 29, 2008.

DeHaan, "Methods and Systems for Providing Remote Software Provisioning to Machines", U.S. Appl. No. 12/195,633, filed Aug. 21, 2008.

DeHaan, "Systems and Methods for Storage Allocation in Provisioning of Virtual Machines", U.S. Appl. No. 12/202,178, filed Aug. 29, 2008.

DeHaan, "Methods and Systems for Providing Customized Actions Related to Software Provisioning", U.S. Appl. No. 12/200,552, filed Aug. 28, 2008.

DeHaan, "Methods and Systems for Automatically Locating a Provisioning Server", U.S. Appl. No. 12/198,290, filed Aug. 26, 2008.

DeHaan, "Methods and Systems for Managing Access in a Software Provisioning Environment", U.S. Appl. No. 12/201,832, filed Aug. 29, 2008.

DeHaan, "Methods and Systems for Importing Software Distributions in a Software Provisioning Environment", U.S. Appl. No. 12/200,631, filed Aug. 28, 2008

DeHaan, "Methods and Systems for Managing Network Connections Associated with Provisioning Objects in a Software Provisioning Environment", U.S. Appl. No. 12/239,690, filed Sep. 26, 2008.

DeHaan, "Methods and Systems for Monitoring Software Provisioning", U.S. Appl. No. 12/198,378, filed Aug. 26, 2008.

DeHaan, "Systems and Methods for Software Provisioning in Multiple Network Configuration Environment", U.S. Appl. No. 12/202,194, filed Aug. 29, 2008.

DeHaan, "Systems and Methods for Differential Software Provisioning on Virtual Machines Having Different Configurations", U.S. Appl. No. 12/202,019, filed Aug. 29, 2008.

DeHaan, "Systems and Methods for Software Provisioning Machines Having Virtual Storage Resources", U.S. Appl. No. 12/202,189, filed Aug. 29, 2008.

DeHaan et al., "Methods and Systems for Managing Network Connections in a Software Provisioning Environment", U.S. Appl. No. 12/239,681, filed Sep. 26, 2008.

DeHaan et al., "Methods and Systems for Providing a Rescue Environment in a Software Provisioning Environment", U.S. Appl. No. 12/325,007, filed Nov. 28, 2008.

DeHaan et al., "Systems and Methods for Monitoring Hardware Resources in a Software Provisioning Environment", U.S. Appl. No. 12/325,056, filed Nov. 28, 2008.

DeHaan, "Methods and Systems for Providing Power Managment Services in a Software Provisioning Environment", U.S. Appl. No. 12/277,518, filed Nov. 26, 2008.

DeHaan et al., "Methods and Systems for Providing Hardware Updates in a Software Provisioning Environment", U.S. Appl. No. 12/324,991, filed Nov. 28, 2008.

DeHaan et al., "Methods and Systems for Supporting Multiple Name Servers in a Software Provisioning Environment", U.S. Appl. No. 12/324,572, filed Nov. 26, 2008.

DeHaan et al., "Methods and Systems for Secure Gated File Deployment Associated with Provisioning", U.S. Appl. No. 12/393,754, filed Feb. 26, 2009.

(56) References Cited

OTHER PUBLICATIONS

DeHaan, "Systems and Methods for Intergrating Software Provisioning and Configuration Management", U.S. Appl. No. 12/395,379, filed Feb. 27, 2009.
DeHaan, "Systems and Methods for Abstracting Software Content Managment in a Software Provisioning Environment", U.S. Appl. No. 12/395,273, filed Feb. 27, 2009.
DeHaan et al., "Systems and Methods for Providing a Libary of Virtual Images in a Software Provisioning Environment", U.S. Appl. No. 12/395,351, filed Feb. 27, 2009.
DeHaan et al. "Systems and Methods for Inventorying Un-Provisioned Systems in a Software Provisioning Environment", U.S. Appl. No. 12/391,588, filed Feb. 24, 2009.
DeHaan et al., "Systems and Methods for Managing Configuration of Storage Devices in a Software Provisioning Environment", U.S. Appl. No. 12/393,613, filed Feb. 26, 2009.
DeHaan et al., "Systems and Methods for Collecting and Altenng Firmware Configurations of Target Machines in a Software Provisioning Environment", U.S. Appl. No. 12/393,319, filed Feb. 25, 2009.
DeHaan et al., "Methods and Systems for Replicating Provisioning Servers in a Software Provisioning Environment", U.S. Appl. No. 12/392,508, filed Feb. 25, 2009.
DeHaan, "Systems and Methods for Cloning Target Machines in a Software Provisioning Environment", U.S. Appl. No. 12/473,014, filed May 27, 2009.
DeHaan, "Systems and Methods for Message-Based Installation Management Using Message Bus", U.S. Appl. No. 12/495,077, filed Jun. 30, 2009.
Henson, "Systems and Methods for Integrating Storage Resources from Storage Area Network in Machine Provisioning Platform", U.S. Appl. No. 12/628,041, filed Nov. 30, 2009.
Henson, "Systems and Methods for Mounting Specified Storage Resources from Storage Area Network in Machine Provisioning Platform", U.S. Appl. No. 12/627,988, filed Nov. 30, 2009.
HP Storage Essentials SRM 6.0 Installation Guide. Jan. 2008. HP. 1st ed. Part No. T4283-96113. pp. 1-5, 97-136, 219-228.
HP Storage Essentials SRM 6.0 User Guide. Jan. 2008. HP. 1st ed. Part No. T4238-96114. pp. 1-83.
Michael DeHann, "Unfiled Provisioning", 2007.
Michael DeHann. "Provisioning With Cobbler". 2007.
Tan at al. "A WBEM Basked Disk Array Management Provider". 2005. IEEE, 2005 International Conference on Cyberworlds.
Lovelace at at. Managing Disk Subsystems using IBM TotalStorage Productivity Center. Sep. 2005. IBM. 2nd ed. SG24-7097-01. pp. 1-42.
Butt et al., "Automated Installation of Large-Scale Linux Networks", 2000.
Agarwalla, "Automating Provisioning of Complete Software Stack in a Grid Environment", 2004.
Anderson et al., "Technologies for Large-Scale Configuration Management", Dec. 9, 2002.
Grosse, "Repository Mirroring", 1995.
Doc Searls, "Linux for Suits", 2005, Specialized System Consultants Inc., vol. 2005.
eBook "Microsoft System Management Server 2003 Administrator's companion", Microsoft Press, c2004, Ch. 13, Patch Management, pp. 471-507.
Novak, Judit, "Automatic Installation and Configuration for Large Scale Farms", 89 pages, 2005.
Quintero et al., "Introduction to pSeries Provisioning", 216 pages, 2004.
Maghraoui et al., "Model Driven Provisioning: Bridging the Gap Between Declarative Object Models and Procedural Provisioning Tools", 21 pages, 2006.
USPTO, Office Action for U.S. Appl. No. 11/763,315 mailed Oct. 7, 2010.
USPTO, Office Action mailed for U.S. Appl. No. 11/763,315 mailed Apr. 20, 2011.
USPTO, Notice of Allowance mailed for U.S. Appl. No. 11/763,315 mailed Nov. 2, 2011.
USPTO, Advisory Action for U.S. Appl. No. 11/763,315 mailed Jun. 24, 2011.
USPTO, Notice of Allowance for U.S. Appl. No. 13/399,998 mailed May 15, 2012.
USPTO, Office Action for U.S. Appl. No. 11/763,333 mailed Oct. 7, 2010.
USPTO, Office Action for U.S. Appl. No. 11/763,333 mailed Apr. 20, 2011.
USPTO, Advisory Action for U.S. Appl. No. 11/763,333 mailed Jun. 23, 2011.
USPTO, Notice of Allowance for U.S. Appl. No. 11/763,333 mailed Oct. 27, 2011.
USPTO Notice of Allowance mailed Oct. 27, 2011 for U.S. Appl. No. 11/763,333.
USPTO Office Action mailed Dec. 20, 2011 for U.S. Appl. No. 12/239,690.
USPTO Office Action mailed May 14, 2012 for U.S. Appl. No. 12/239,690.
USPTO Office Action mailed Dec. 19, 2012 for U.S. Appl. No. 12/239,690.
USPTO Office Action mailed Apr. 16, 2013 for U.S. Appl. No. 12/239,690.
USPTO Office Action mailed Feb. 29, 2012 for U.S. Appl. No. 12/395,351.
USPTO Office Action mailed Jun. 14, 2012 for U.S. Appl. No. 12/395,351.
USPTO Office Action mailed Oct. 11, 2012 for U.S. Appl. No. 12/395,351.
USPTO Office Action mailed Oct. 12, 2010 for U.S. Appl. No. 12/325,056.
USPTO Office Action mailed Mar. 31, 2011 for U.S. Appl. No. 12/325,056.
USPTO Office Action mailed Mar. 6, 2012 for U.S. Appl. No. 12/325,056.
USPTO Office Action mailed Jun. 19, 2012 for U.S. Appl. No. 12/325,056.
USPTO Office Action mailed Jun. 28, 2013 for U.S. Appl. No. 12/325,056.
USPTO Notice of Allowance mailed Oct. 21, 2013 for U.S. Appl. No. 12/325,056.
USPTO Office Action mailed Mar. 29, 2010 for U.S. Appl. No. 12/130,424.
USPTO Office Action mailed Dec. 10, 2010 for U.S. Appl. No. 12/130,424.
USPTO Office Action mailed May 2, 2013 for U.S. Appl. No. 12/130,424.
USPTO Office Action mailed Aug. 21, 2013 for U.S. Appl. No. 12/130,424.
USPTO Notice of Allowance mailed Dec. 12, 2013 for U.S. Appl. No. 12/130,424.

* cited by examiner

REGISTERING NEW MACHINES IN A SOFTWARE PROVISIONING ENVIRONMENT

FIELD

This invention relates generally to software provisioning.

DESCRIPTION OF THE RELATED ART

Software provisioning is the process of selecting a target machine, such as a server, loading the appropriate software (operating system, device drivers, middleware, and applications), and customizing and configuring the system and the software to make it ready for operation. Software provisioning can entail a variety of tasks, such as creating or changing a boot image, specifying parameters, e.g. IP address, IP gateway, to find associated network and storage resources, and then starting the machine and its newly-loaded software. Typically, a system administrator will perform these tasks using various tools because of the complexity of these tasks. Unfortunately, there is a lack of provisioning control tools that can adequately integrate and automate these tasks.

Typically, the provisioning control tools require that the system administrator manually identify each machine that will be subject to software provisioning. As such, the administrator must be personally aware of and identify new machines added to the provisioning environment and manually add the new machines to an inventory of machines subject to the software provisioning. Accordingly, it would be desirable to provide a provisioning environment that can automatically detect and register new machines as they are added to the provisioning environment.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for automatically registering new machines in a software provisioning environment. More particularly, a provisioning server can automatically detect new target machines connected to the provisioning environment and register the new target machines.

According to embodiments, a provisioning server can be configured to include an inventory module. The inventory module can be configured to automatically detect new target machines that are connected to the provisioning environment. Once detected, the inventory module can be configured to determine identification information for the detected target machines. The identification information can include information that uniquely identifies the detected machines and information describing the detected machines.

According to embodiments, the provisioning server can be configured to register the detected machines with the provisioning environment. In particular, the inventory module can be configured to enter the identification information in an inventory of machines in the provisioning environment. Once registered, the provisioning server can perform provisioning processes on the detected machines. In embodiments, the provisioned software can include an operating system installation.

By automatically detecting new target machines, the provisioning server can identify new machines without interaction from a user or administrator. As such, new machines can be added to the provisioning environment with minimal interaction and configuration by the administrator. Additionally, the administrator is not required to inventory the provisioning environment or monitor the environment for updates because new or added systems are automatically registered and inventoried upon installation.

Figure 1:
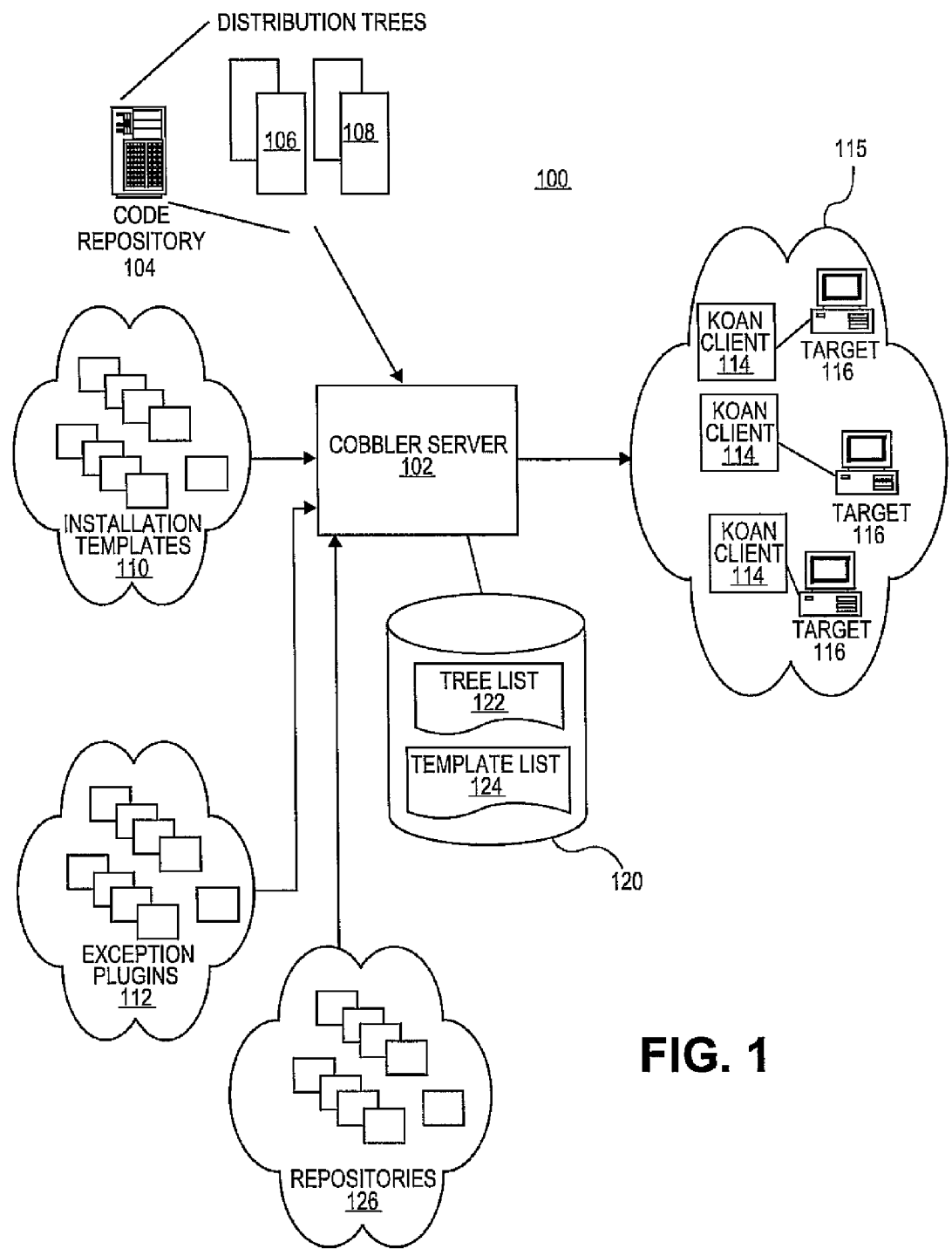
FIG. 1 illustrates an overall provisioning environment in which various embodiments of the present teachings can be practiced.

FIG. 1 illustrates an overall provisioning environment 100, in systems and methods for the execution, management, and monitoring of software provisioning, according to exemplary aspects of the present disclosure. Embodiments described herein can be implemented in or supported by the exemplary environment illustrated in FIG. 1. The provisioning environment 100 provides a unified provisioning environment, which comprehensively manages the tasks related to software provisioning.

In particular, the provisioning environment 100 can manage software provisioning using a hierarchy of commands. In exemplary embodiments, the hierarchy can include at least four levels of commands. The lowest level in the hierarchy can comprise distribution commands, which primarily handle base operating system specific tasks of provisioning. The second level can comprise profile commands, which associate a configuration file, such as a kickstart file for Linux or other operating system, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The provisioning environment 100 provides several capabilities and advantages over the known provisioning solutions. For example, the present invention is capable of handling a variety of forms of installations, such as preboot execution environment ("PXE"), virtualization, re-installations, and image installations.

In exemplary aspects, the provisioning environment 100 enables integrating virtualization into a PXE provisioning infrastructure and provides several options to reinstall running machines as well. The provisioning environment 100 can integrate mirroring of package repositories with the provisioning process, so that a provisioning server may serve as a central mirror point of contract for all of an organization's software needs. In aspects, a set of remote mirrored repositories can automatically be used by provisioned systems without additional setup.

Reference will now be made in detail to the exemplary aspects the provisioning environment 100. The provisioning environment 100 can be applied to provisioning any form of software, such as Windows systems, UNIX systems, and Linux systems. In the exemplary description that follows, FIG. 1 is presented to explain the provisioning environment 100 for provisioning software, such as Linux, and Linux based software, such as Fedora and Red Hat Enterprise Linux by Red Hat, Inc.

In provisioning of software such as Linux, many system administrators use what is known as the "kickstart" installation method. Kickstart files are files that specify the intended configuration of the software being provisioned. Kickstart files can be kept on a server and can be read by individual computers during the installation. This installation method allows the use a single or relatively few standard kickstart files to install Linux on multiple machines, making it ideal for network and system administrators.

The kickstart file can be a simple text file, containing a list of items, each identified by a keyword. In general, a kickstart file can be edited with any text editor or word processor that can save files as ASCII text. One skilled in the art will recognize that the present invention may be applied to non-kickstart files in software provisioning. For example, configuration files such as AutoYAST Answer files used in Novell SuSE Linux and Sun Solaris Jumpstart files may also be used by the provisioning environment 100.

Typically, a kickstart file can be copied to the boot disk, or made available on the network. The network-based approach is most commonly used, as most kickstart installations for software provisioning, such as Linux systems, tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical software installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

According to exemplary aspects illustrated in FIG. 1, the provisioning environment 100 can include a provisioning server 102, a code repository 104 which provides access to distributions 106 and 108, a set of installation templates 110, a set of exception plugins 112, a helper client 114 running on target machines 116 in a network 115, a provisioning database 120 which comprises a distribution tree list 122 and template list 124. Each of these components will now be further described.

The provisioning server (from herein referred to as a "cobbler") 102 is responsible for: serving as a extensible markup language remote procedure call (XMLRPC) handler; linking to or mirroring install distribution trees and a configuration database; hosting kickstart templates; hosting plugins, generating installation images, and the like. The cobbler server 102 can be implemented as software, such as Python code, installed on a boot server machine and provides a command line interface for configuration of the boot server. In addition, the cobbler server 102 can make itself available as a Python application programming interface (API) for use by higher level management software (not shown). The cobbler server 102 supports provisioning via PXE, image (ISO) installation, virtualization, re-provisioning. As will be described later, the last two modes are performed with the assistance of a helper client 114.

The code repository 104 is responsible for hosting distributions 106 and 108. The code repository 104 may be implemented using well known components of hardware and software. Additionally, the code repository 104 can be include one or more repositories hosting distributions. The distributions 106 and 108 can include bundles of software that is already compiled and configured. The distributions 106 and 108 may be in the form of either rpm, deb, tgz, msi, exe formats, and the like. For example, as Linux distributions, the distributions 106 and 108 are bundles of software that comprise the Linux kernel, the non-kernel parts of the operating system, and assorted other software. The distributions 106 and 108 can take a variety of forms, from fully-featured desktop and server operating systems to minimal environments.

In exemplary aspects, the installation templates 110 are any data structure or processing element that can be combined with a set of installation configurations and processed to produce a resulting configuration file, such as a kickstart file.

In exemplary aspects, exception plugins 112 is software that interacts with cobbler server 102 to customize the provisioning of software. In general, the exceptions plugins 112 are intended to address infrequent customization needs.

In exemplary aspects, the helper client known as "koan", which stands for "kickstart-over-a-network") 114 can assist the cobbler server 102 during the provisioning processes. The koan 114 can allow for both network provisioning of new virtualized guests and destructive provisioning of any existing system. When invoked, the koan 114 can request profile information from a remote boot server that has been configured with the cobbler server 102. In some aspects, what the koan 114 does with the profile data depends on whether it was invoked with—virt or—replace-self.

In exemplary aspects, the koan 114 can enable replacing running systems as well as installing virtualized profiles. The koan 114 can also be pushed out to systems automatically from the boot server. In some aspects, the koan client 114 is also written in Python code to accommodate a variety of operating systems, machine architectures, etc.

In exemplary aspects, the network 115 can include a number of the target machines 116. The target machines 116 can represent the particular machines to which software provisioning is directed. The target machines 116 may represent a wide variety of computing devices, such as personal computers, servers, laptop computers, personal mobile devices, and the like. In some aspects, the target machines 116 can represent distributed computing environments such as cloud computing environments. Although FIG. 1 shows several of the target machines 116, the provisioning environment 100 can be capable of managing a wide range environments, such as datacenters with thousands of machines or server pools with just a few machines. Additionally, the cobbler server 102 can be connected to multiple networks 115.

In exemplary aspects, the provisioning database 120 can serve as a data storage location for holding data used by the cobbler server 102. For example, as shown, the provisioning database 120 can comprise the distribution tree list 122 and the template list 124. The distribution tree list 122 can provide an inventory of the distributions 106 and 108 that are hosted or mirrored by the cobbler server 102. The template list 124 can provide an inventory of the templates 110 that are hosted by the cobbler server 102.

As noted above, the cobbler server 102 can manage provisioning using a hierarchical concept of distribution commands, profile commands, system commands, and repository commands. This framework enables the cobbler server 102 to abstract the differences between multiple provisioning types (installation, reinstallation, and virtualization) and allows installation of all three from a common platform. This hierarchy of commands also permits the cobbler server 102 to integrate software repositories 126 with the provisioning process, thus allowing systems to be configured as a mirror for software updates and third party content as well as distribution content.

Distributions can contain information about base operating system tasks, such as what kernel and initial ramdisk ("initrd") are used in the provisioning, along with other information, such as required kernel parameters. Profiles associate one of the distributions 106 and 108 with a kickstart file and optionally customize it further, for example, using plugins 112. Systems commands associate a hostname, IP, or MAC with a distribution and optionally customize the profile further. Repositories contain update information, such as yum mirror information that the cobbler server 102 uses to mirror repository 104. The cobbler server 102 can also manage (generate) DHCP configuration files using the templates 110.

In exemplary aspects, the cobbler server 102 can use a provisioning environment that is fully templated, allowing for kickstarts and PXE files to be customized by the user. The cobbler server 102 uses the concept of "profiles" as an intermediate step between the operating system and the installed system. A profile is a description of what a system does rather than the software to be installed. For instance, a profile might describe a virtual web server with X amount of RAM, Y amounts of disk space, running a Linux distribution Z, and with an answer file W.

In exemplary aspects, the cobbler server 102 can provide a command line interface to configure a boot server in which it is installed. For example, the format of the cobbler server 102 commands can be generally in the format of: cobbler command [subcommand] [—arg1=] [—arg2=]. Thus, a user can specify various aspects of software provisioning via a single interface, such as a command line interface or other known interface. Examples of exemplary cobbler commands can be found in U.S. patent application Ser. No. 11/763,315, U.S. Patent Application Publication No. 2008-0288938 and U.S. patent application Ser. No. 11/763,333, U.S. Patent Publication No. 2008-0288939, the disclosures of which are incorporated herein, in their entirety, by reference.

According to exemplary aspects, a user can use various commands of the provisioning environment 100 to specify distributions and install trees hosted by the code repository 104, such as a distribution from the distributions 106 or 108. A user can add or import a distribution or import it from installation media or an external network location.

According to exemplary aspects, in order to import a distribution, the cobbler server 102 can auto-add distributions and profiles from remote sources, whether this is an installation media (such as a DVD), an NFS path, or an rsync mirror. When importing a rsync mirror, the cobbler server 102 can try to detect the distribution type and automatically assign kickstarts. By default in some embodiments, the cobbler server can provision by erasing the hard drive, setting up eth0 for DHCP, and using a default password. If this is undesirable, an administrator may edit the kickstart files in /etc/cobbler to do something else or change the kickstart setting after the cobbler server 102 creates the profile.

According to exemplary aspects, a user may map profiles to the distributions and map systems to the profiles using profile commands and systems commands of the provisioning environment 100. A profile associates a distribution to additional specialized options, such as a kickstart automation file. In the cobbler server 102, profiles are the unit of provisioning and at least one profile exists for every distribution to be provisioned. A profile might represent, for instance, a web server or desktop configuration.

According to exemplary aspects, a user can map systems to profiles using system commands. Systems commands can assign a piece of hardware with cobbler server 102 to a profile. Systems can be defined by hostname, Internet Protocol (IP) address, or MAC address. When available, use of the MAC address to assign systems can be preferred.

According to exemplary aspects, the user can map repositories and profiles using repository commands. Repository commands can address configurations and tasks related to updating the software, remote installation procedures, and optionally customizing the software. These repository commands can also specify mirroring of the provisioned software to remote servers. Repository mirroring can allow the cobbler server 102 to mirror not only install the trees 106 and 108, but also optional packages, third party content, and updates. Mirroring can be useful for faster, more up-to-date installations and faster updates) or providing software on restricted networks. The cobbler server 102 can also include other administrative features, such as allowing the user to view their provisioning configuration or information tracking the status of a requested software installation.

According to exemplary aspects, a user can utilize commands to create a provisioning infrastructure from a distribution mirror. Then a default PXE configuration is created, so that by default systems will PXE boot into a fully automated install process for that distribution. The distribution mirror can be a network rsync mirror or a mounted DVD location.

According to exemplary aspects, the administrator uses a local kernel and initrd file (already downloaded), and shows how profiles would be created using two different kickstarts—one for a web server configuration and one for a database server. Then, a machine can be assigned to each profile.

According to exemplary aspects, a repo mirror can be set up for two repositories, and create a profile that will auto install those repository configurations on provisioned systems using that profile.

According to exemplary aspects, in addition to normal provisioning, the cobbler server 102 can support yet another option, called "enchant". Enchant takes a configuration that has already been defined and applies it to a remote system that might not have the remote helper program installed. Users might want to use this command to replace a server that is being repurposed, or when no PXE environment can be created. Thus, the enchant option allows the remote the koan client 114 to be executed remotely from the cobbler server 102.

According to aspects, if the cobbler server 102 is configured to mirror certain repositories, the cobbler server 102 can then be used to associate profiles with those repositories. Systems installed under those profiles can be auto configured to use these repository mirrors in commands and, if supported, these repositories can be leveraged. This can be useful for a large install base, fast installation and upgrades for systems are desired, or software not in a standard repository exists and provisioned systems are desired to know about that repository.

According to exemplary aspects, the cobbler server 102 may also keep track of the status of kickstarting machines. For example, the "cobbler status" will show when the cobbler server 102 thinks a machine started kickstarting and when it last requested a file. This can be a desirable way to track machines that may have gone inactive during kickstarts. The cobbler server 102 can also make a special request in the post section of the kickstart to signal when a machine is finished kickstarting.

According to exemplary aspects, for certain commands, the cobbler server 102 will create new virtualized guests on a machine in accordance to the orders from the cobbler server 102. Once finished, an administrator may use additional commands on the guest or other operations. The cobbler server 102 can automatically name domains based on their MAC addresses. For re-kickstarting, the cobbler server 102 can reprovision the system, deleting any current data and replacing it with the results of a network install.

According to exemplary aspects, the cobbler server 102 can configure boot methods for the provisioning requested by the user. For example, the cobbler server 102 can configure a PXE environment, such as a network card BIOS. Alternatively, the cobbler server 102 can compile and configure information for koan client 104. The cobbler server 102 can also optionally configured DHCP and DNS configuration information.

According to exemplary aspects, the cobbler server 102 can serve the request of the koan client 114. The koan client 114 can acknowledge the service of information of the cobbler server 102 and then can initiate installation of the software being provisioned. Additionally, the koan client 114 can either install the requested software, e.g., replace the existing operating system, or install a virtual machine.

Figure 2:
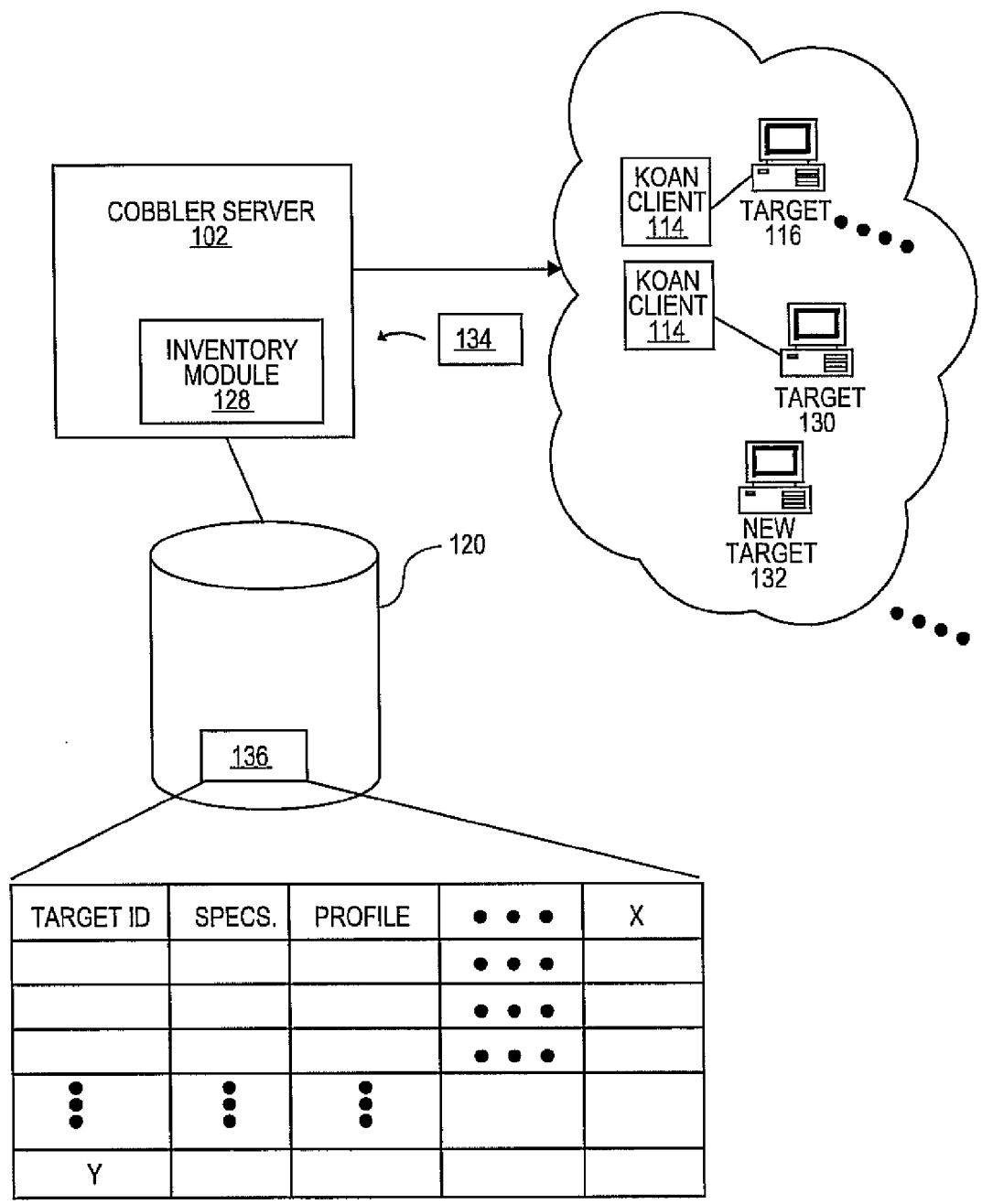
FIG. 2 illustrates the overall provisioning environment in which new target machines are automatically detected and registered, according to various embodiments.

FIG. 2 illustrates aspects of the provisioning environment 100 that allows for automatic detection and registration of target machines in the provisioning environment 100, according to various embodiments. In embodiments, the provisioning environment 100 provides a cobbler server 102 that includes an inventory module 128.

In embodiments as shown, the inventory module 128 can be configured to automatically detect new target machines installed in the provisioning environment 100, to register the new target machines with the provisioning environment 100, and place the new target machines in the inventory of target machines in the provisioning environment 100. For example, as shown, the inventory module 128 can be configured to detect new target machines 130 and 132 that have been added to network 115.

In order to detect the new target machines, the inventory module 128 can contain control logic that can communicate with the network 115 to detect the new target machine 130 and new target machine 132. For example, for the new target machine 130 which includes a Koan client 114, the inventory module 128 can be configured to communicate with the Koan client 114 in order to detect the new target machine 130. In this case, once the new target 130 is installed in the network 115, the Koan client 114 can be configured to provide an indication of a new target machine once the Koan client 114 for the new target machine 130 boots against the cobbler server 102.

Additionally, the inventory module 128 can be configured to detect the new target machine 132 that does not include a Koan client 114. For example, the inventory module 128 can include control logic that performs well-known network queries to identify the new target machine 132.

According to embodiments, during detection, the inventory module 128 can be configured to determine identification information 134 from the new target machines 130 and 132. The identification information 134 can include any type of information that identifies the new target machines. The identification information 134 can include information that uniquely identifies the new target machines in the network 115 such as Media Access Control ("MAC") address, Ethernet Hardware Address ("EHA"), and the like. The identification information 134 can also include other information that identifies the new target machines such as identification of the koan client 114, specifications of the new target machines, network information of the new target machines (IP address, host name, etc.), and software installed on the new target machines.

In order to determine the identification information 134, the inventory module 128 can be configured to obtain the identification information 134 from the new target machine 130 and the new target machine 132. For example, for the new target machine 130, the inventory module 128 can be configured to communicate with the koan client 114 in order to determine the identification information 134. Additionally, for the new target machine 132, the inventory module 128 can be configured to utilize well-known network queries in order to obtain the identification information 134.

According to embodiments, once the new target are detected and the identification information 134 is determined, the cobbler server 102 can be configured to register the new target machine. In particular, the inventory module 128 can be configured to enter the identification information 134 for the new target machine 130 and the new target machine 132 in an inventory 136. The inventory 136 can be a data structure including a number of fields for storing the identification information 134. Additionally, the inventory 136 can be configured to include other information such profiles of provisioned software for the target machines. The inventory 136 can also include the identification information of the target machines already registered with the cobbler server 102.

For each new target machine, the inventory module 128 can create a new entry in the inventory 136 and enter the identification information 134 in the new entry. If the inventory 136 does not exist, the inventory module 128 can be configured to create a new inventory 136 and populate the new inventory 136 with identification information for the new target machines.

According to embodiments, the cobbler server 102 can be configured to maintain the inventory 136 in the provisioning database 120. Likewise, the cobbler server 102 can be configured to maintain the inventory 136 in any other type of storage, such as storage associated with the inventory module 128.

According to embodiments, once the new targets are registered, the cobbler server 102 can perform any of the provisioning process described above. For example, for the new target machines 130 and 132, the cobbler server 102 can be configured to automatically provision a default profile to the new target machines. Likewise, the cobbler server 102 can preform other processes on the new target machines, such as network process (changing IP address, hostname, etc.). Once provisioning process or other processes are performed, the cobbler server 102 can be configured to update the inventory 136 to reflect changes in the information for any target machines.

Figure 3:
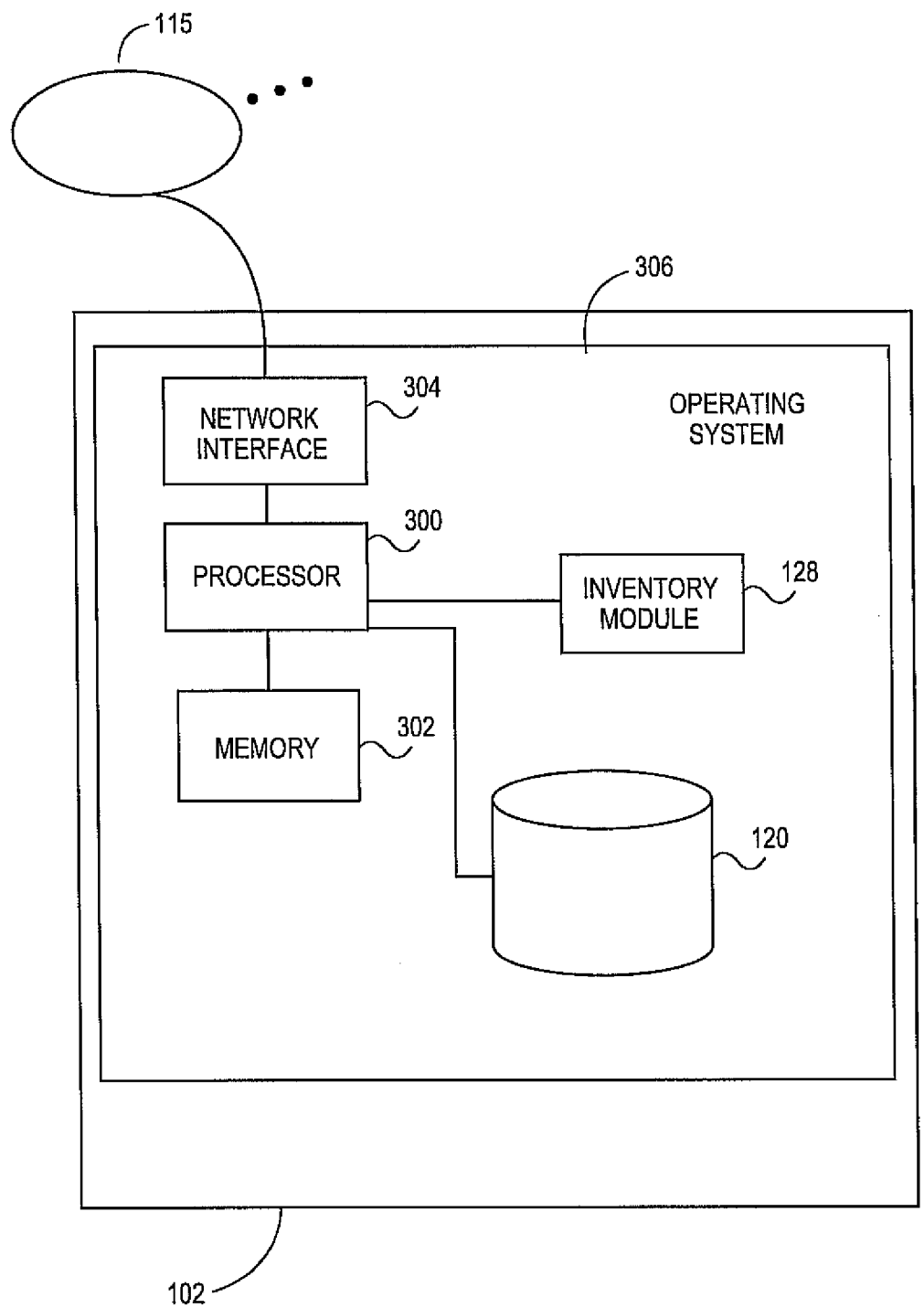
FIG. 3 illustrates an exemplary hardware configuration for a provisioning server, according to various embodiments.

FIG. 3 illustrates an exemplary diagram of hardware and other resources that can be incorporated in the cobbler server 102 configured to communicate with the network 115 and the target machines in network 115, according to embodiments. In embodiments as shown, the cobbler server 102 can comprise a processor 300 communicating with memory 302, such as electronic random access memory, operating under control of or in conjunction with operating system 306. Operating system 306 can be, for example, a distribution of the Linux™ operating system, the Unix™ operating system, or other open-source or proprietary operating system or platform. Processor 300 also communicates with the provisioning database 120, such as a database stored on a local hard drive. While illustrated as a local database in the cobbler server 102, the provisioning database 120 can be separate from the cobbler server 102 and the cobbler server 102 can be configured to communicate with the remote provisioning database 120.

Processor 300 further communicates with network interface 304, such as an Ethernet or wireless data connection, which in turn communicates with one or more networks 115, such as the Internet or other public or private networks. Processor 300 also communicates with the provisioning database 120 and the inventory module 128, to execute control logic and perform the provisioning processes and the inventory processes described above. Other configurations of the cobbler server 102, associated network connections, and other hardware and software resources are possible.

While FIG. 3 illustrates the cobbler server 102 as a standalone system comprising a combination of hardware and software, the cobbler server 102 can also be implemented as a software application or program capable of being executed by a convention computer platform. Likewise, the cobbler server 102 can also be implemented as a software module or program module capable of being incorporated in other software applications and programs. In either case, the cobbler server 102 can be implemented in any type of conventional proprietary or open-source computer language.

Figure 4:
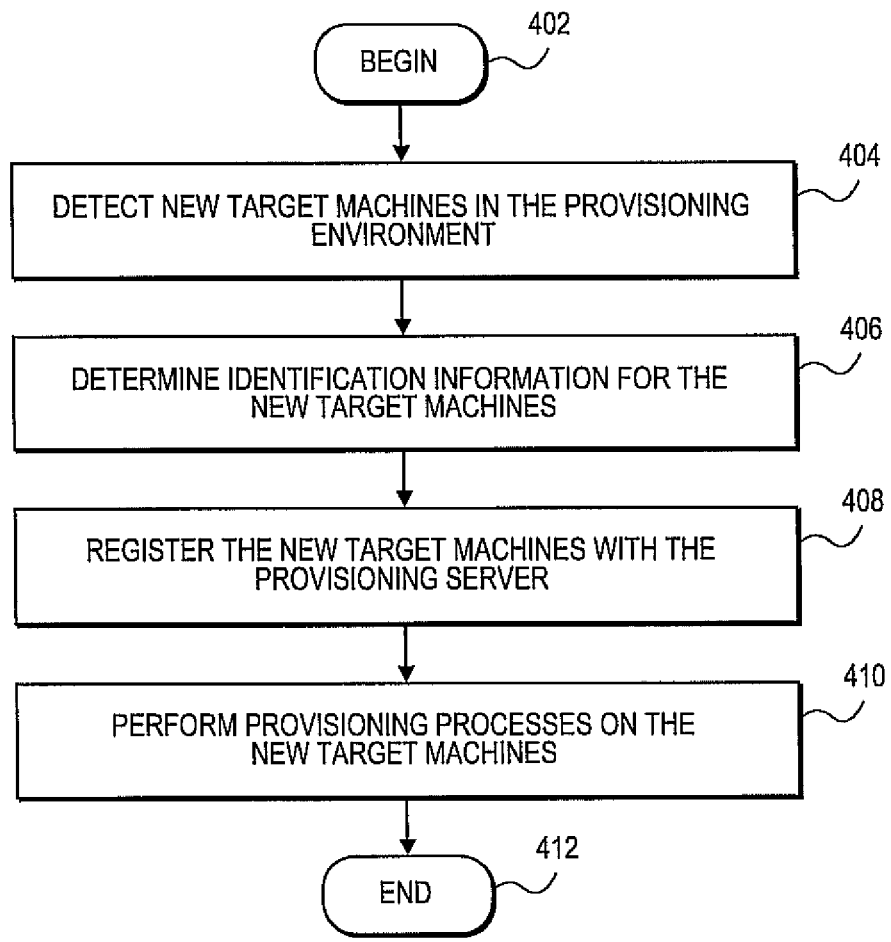
FIG. 4 illustrates a flowchart for automatic detection and registration of new target machines, according to various embodiments.

FIG. 4 illustrates a flow diagram of overall inventory processes in the provisioning environment 100, according to embodiments of the present teachings. In 402, processing can begin. In 404, the inventory module 128 can detect new target machines connected to the network 115.

In 406, the inventory module 128 can determine identification information for the new target machines. The identification information 134 can include information that uniquely identifies the new target machines in network 115 such as Media Access Control ("MAC") address, Ethernet Hardware Address ("EHA"), and the like. The identification information 134 can also include other information that identifies the new target machines such as identification of the koan client 114, specifications of the new target machines, network information of the new target machines (IP address, host name, etc.), and software installed on the new target machines.

In 408, the inventory module 128 can register the new target machines with the cobbler server 102. The inventory module 128 can store the determined identification information in an inventory stored at the cobbler server 102. Then, in 410, the cobbler server 102 can perform provisioning process on the new target machines. In 412, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method, comprising:
    detecting, by a processing device, a connection of a target computing system to a system of the processing device via a network, wherein the detecting is performed without interaction of a user of the target computing system or an administrator of the system;
    providing, by the processing device in view of the detecting, a client application to the target computing system for installation of the client application on the target computing system;
    communicating, by the processing device, with the client application executing on the target computing system;
    determining, via the communicating with the client application, identification information associated with the target computing system, wherein the identification information comprises a network identification of the target computing system;
    registering, by the processing device, the target computing system with a software provisioning environment to provision a software distribution to the target computing system, the registering performed via the communicating with the client application and without interaction of another user of the software provisioning environment; and
    provisioning, by the processing device, the software distribution to the target computer system using a hierarchical set of commands.

2. The method of claim 1, wherein the identification information comprises a network hardware identification of the target computing system.

3. The method of claim 2, wherein the identification information further comprises network information for the target computing system, system information for the target computing system, and identification of software installed on the target computing system.

4. The method of claim 1, further comprising:
    provisioning a software distribution from a code repository to the target computing system.

5. The method of claim 4, wherein the provisioning further comprises:
    retrieving the software distribution;
    linking a configuration file to the software distribution;
    receiving information indicating a system remote that will assist in installing the software distribution on the target computing system;
    receiving update information for the software distribution; and
    installing the software distribution and the update information on the target computing system in view of the configuration file with the assistance of the system remote.

6. The method of claim 1, wherein registering the target computing system comprises:
    installing predetermined software on the target computing system.

7. The method of claim 1, wherein detecting the target computing system comprises:
    communicating with a system remote associated with the target computing system.

8. The method of claim 1, further comprising:
    assigning a new network identification to the target computing system to replace the network identification.

9. A system, comprising:
    a network device to interface to a network; and a processing device to communicate with the network device to:
- detect a connection of a target computing system to the system view the network, wherein the detecting is performed without interaction of a user of the target computing system or an administrator of the system;
- provide, in view of the detecting, a client application to the target computing system for installation of the client application on the target computing system;
- communicate with the client application executing on the target computing system;
- determine, via the communicating with the client application, identification information associated with the target computing system, wherein the identification information comprises a network identification of the target computing system;
- register the target computing system with a software provisioning environment to provision a software distribution to the target computing system, the registering performed via the communicating with the client application and without interaction of another user of the software provisioning environment; and
- provision the software distribution to the target computer system using a hierarchical set of commands.

10. The system of claim 9, wherein the identification information comprises a network hardware identification of the target computing system.

11. The system of claim 10, wherein the identification information further comprises network information for the target computing system, system information for the target computing system, and identification of software installed on the target computing system.

12. The system of claim 9, wherein the processing device further is to:
provision a software distribution from a code repository to the target computing system.

13. The system of claim 12, wherein the processing device further is to:
retrieve the software distribution;
link a configuration file to the software distribution;
receive information indicating a system remote that will assist in installing the software distribution on the target computing system;
receive update information for the software distribution; and
install the software distribution and the update information on the target computing system in view of the configuration file with the assistance of the system remote.

14. The system of claim 9, wherein the processing device further is to:
install predetermined software on the target computing system.

15. The system of claim 9, wherein the processing device further is to:
communicate with a provisioning client installed on the target computing system.

16. The system of claim 9, wherein the processing device further is to:
assign a new network identification to the target computing system to replace the network identification.

17. A non-transitory computer readable medium having instructions stored thereon that, when executed by a processing device, cause the processing device to perform operations comprising:
detecting, by the processing device, a connection of a target computing system to a system of the processing device via a network, wherein the detecting is performed without interaction of a user of the target computing system or an administrator of the system;
providing, by the processing device in view of the detecting, a client application to the target computing system for installation of the client application on the target computing system;
communicating, by the processing device, with the client application executing on the target computing system;
determining, via the communicating with the client application, identification information associated with the target computing system, wherein the identification information comprises a network identification of the target computing system;
registering, by the processing device, the target computing system with a software provisioning environment to provision a software distribution to the target computing system, the registering performed via the communicating with the client application and without interaction of another user of the software provisioning environment; and
provisioning, by the processing device, the software distribution to the target computer system using a hierarchical set of commands.

18. The non-transitory computer readable medium of claim 17, wherein the identification information comprises a network hardware identification of the target computing system.

19. The non-transitory computer readable medium of claim 18, wherein the identification information further comprises network information for the target computing system, system information for the target computing system, and identification of software installed on the remote targeting system.

20. The non-transitory computer readable medium of claim 17, the operations further comprising:
provisioning a software distribution from a code repository to the target computing system.

21. The non-transitory computer readable medium of claim 20, wherein the provisioning comprises:
retrieving the software distribution;
linking a configuration file to the distribution;
receiving information indicating a system remote that will assist in installing the software distribution on the target computing system;
receiving update information for the software distribution; and
installing the software distribution and the update information on the target computing system in view of the configuration file with the assistance of the system remote.

22. The non-transitory computer readable medium of claim 17, wherein registering the target computing system comprises:
installing predetermined software on the target computing system.

23. The non-transitory computer readable medium of claim 17, wherein detecting the target computing system comprises:
communicating with a system remote associated with the target computing system.

24. The non-transitory computer readable medium of claim 17, the operations further comprising:
assigning a new network identification to the target computing system to replace the network identification.

25. A method, comprising:
receiving, by a client application executed by a processing device of a target computing system connected to a network, a request to identify the target computing system, the client application provided to the target computer system by a provisioning server upon detection of a connection of the target computing system to a system of the provisioning server via a network, wherein the detection is performed without interaction of a user of the target computing system or an administrator of the system;
determining, by the client application, identification information associated with the target computing system, wherein the identification information comprises a network identification of the target computing system; and
transmitting, by the client application, the identification information to the provisioning server;
wherein the provisioning server is to use the identification information to register the target computer system without interaction of a user of the software provisioning environment and wherein the provisioning server is to provision a software distribution to the target computing system in view of a specified configuration associated with a hierarchical set of commands.

* * * * *